Dec. 1, 1970   R. M. BREMNER   3,543,377
VIBRATORY TOWING HEAD
Original Filed Nov. 4, 1968

INVENTOR.
RAYMOND M. BREMNER
BY Maybee & Legris
ATTORNEYS

United States Patent Office 3,543,377
Patented Dec. 1, 1970

3,543,377
VIBRATORY TOWING HEAD
Raymond Muir Bremner, 102 Lynedock Crescent,
Don Mills, Ontario, Canada
Continuation of application Ser. No. 773,084, Nov. 4,
1968. This application Dec. 30, 1968, Ser. No. 787,932
Int. Cl. B23p 19/04; F16l 55/18
U.S. Cl. 29—234
6 Claims

ABSTRACT OF THE DISCLOSURE

Means for drawing a flexible tubular member through a pipe or bore comprises a vibratory head having a cylindrical outer surface which is adapted to engage telescopically one end of the flexible tubular member so as to be embraced thereby. An air motor which drives an eccentric mass rotor is mounted within the vibratory head, and a tow cable is connected to the forward end of the vibratory head by means of a pulley mounted on the vibratory head and connected thereto by a swivel mounting.

CROSS REFERENCE TO RELATED APPLICATION

This application is a continuation of my co-pending patent application Ser. No. 773,084, filed Nov. 4, 1968 and entitled "Pipe Relining Method and Apparatus."

BACKGROUND OF THE INVENTION

This invention relates to means for drawing a flexible tubular member, such as a tubular liner, through a pipe or bore.

In my copending patent application Ser. No. 773,084 entitled "Pipe Relining Method and Apparatus," there is described a process for relining pipes, especially sewer pipes in cities, municipalities, townships and villages, and waste pipes used in chemical and industrial plant. In the process described in the above identified application, a flexible tubular liner of plastic material, having an external diameter which is slightly less than the internal diameter of the pipe, is inserted into the pipe and pulled along the pipe while vibratory forces are imparted to its leading end. The present invention is concerned particularly with a vibratory head for imparting the vibratory forces to the leading end of the liner.

SUMMARY OF THE INVENTION

According to the present invention, a vibratory head for drawing a flexible tubular member through a pipe or bore comprises a cylindrical housing adapted to engage telescopically one end of the flexible tubular member so that the latter embraces the external surface of the housing, means for securing the flexible tubular member to the external surface of the housing, and vibratory means mounted within the housing for vibrating the housing transversely to its axis. A closure member is provided at the leading end of the housing, and means are provided for connecting a tow cable to the closure member. Preferably the tow cable engages a pulley which is mounted on the closure member by a swivel mounting so that the pulley may swivel freely with respect to the axis of the cylindrical housing.

BRIEF DESCRIPTION OF THE DRAWINGS

One vibratory head in accordance with the invention will now be described by way of example with reference to the accompanying drawings, in which.

DESCRIPTION OF THE PREFERRED EMBODIMENT

Figure 1:
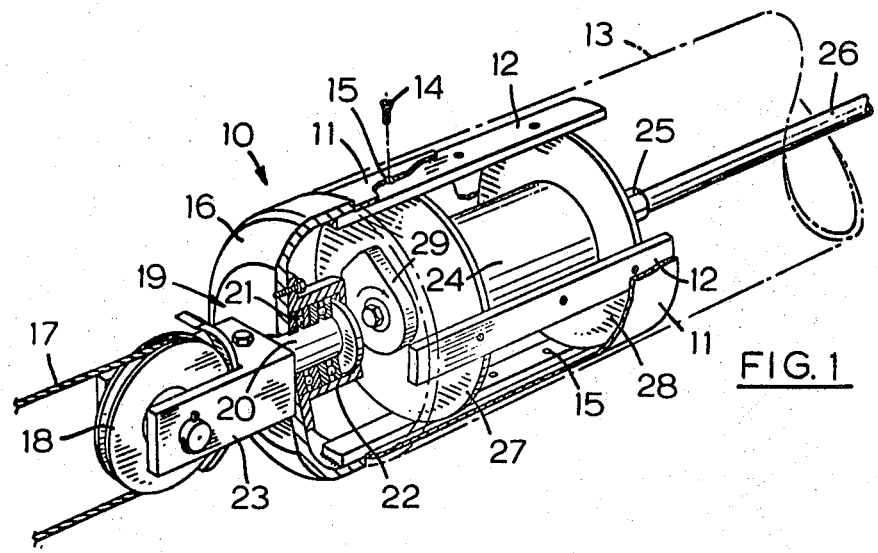
FIG. 1 is a perspective view, partly broken away, of the vibratory head.

Referring to FIG. 1, the vibratory head 10 comprises a cylindrical housing formed by a steel cylinder 11 having four longitudinally extending ribs 12. The housing engages telescopically one end of the tubular flexible member 13 which is to be drawn through the pipe or bore, so that the member 13 embraces the outer surface of the cylinder 11. The leading end of the tubular member 13 is bolted to the cylindrical housing by means of bolts 14 which cooperate with tapped holes 15 in the ribs 12. A blunt nose 16, forming a closure member, is welded to the ribs 12 to close the front end of the cylindrical housing. A tow cable 17 is connected to the closure member 16 by means of a pulley 18 around which the cable passes, the pulley being mounted on the closure member by means of a swivel mounting 19. The swivel mounting 19 consists of a freely rotatable shaft 20 arranged coaxially with the cylinder 11 and supported by a thrust bearing assembly 21 within a housing 22 secured to the inner surface of the closure member 16. At the foward end of the shaft 20, which projects forwardly from the closure member 16, a forked bracket 23 carries the pulley 18, so that the latter is free to swivel with respect to the axis of the cylindrical housing. Within the cylindrical housing is a compressed air motor 24 to which compressed air is supplied via an inlet 25, the compressed air being supplied from a compressor (not shown) through a hose 26 connected at one end to the inlet 25. The leading end of the tubular member 13 is threaded over the cylinder 11 and bolted to it as shown. The air motor 24 is mounted between end plates 27, 28, and is coupled to an eccentric mass rotor 29 which vibrates the assembly transversely to its axis as the air motor is driven. The eccentricity of the rotor 29 is preferably adjustable for the purpose of increasing or decreasing the vibratory forces. By vibrating the leading end of the tubular liner in this way as it is pulled through the pipe, it is possible to overcome resistance which could only be overcome otherwise by applying very great traction forces.

Figure 2:
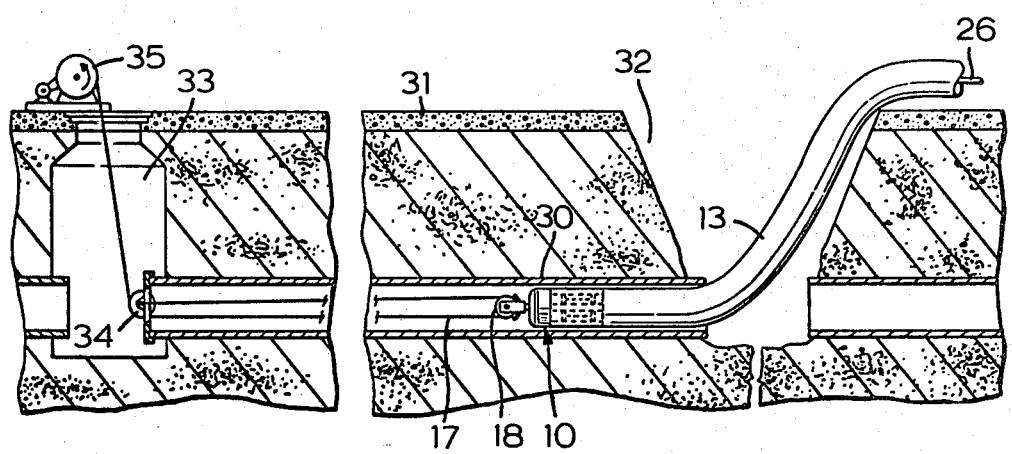
FIG. 2 is a longitudinal sectional view of a sewer pipe showing the vibratory head in use.

FIG. 2 illustrates the mode of use of the vibratory head for drawing a tubular liner 13 through a sewer pipe 30. As illustrated in the drawings, the sewer pipe 30 to be relined extends longitudinally beneath a road having a paved surface 31. An access shaft 32 is excavated at a distance (more or less three hundred feet) from a manhole 33. The tubular liner 13 is fed through the access shaft 32, the leading end of the liner having been secured to the vibratory head 10 in the manner described with reference to FIG. 1. The vibratory head is towed along the length of the pipe 30 by means of the cable 17 which passes round the pulley 18 and a pulley 34. Traction is applied to the cable 17 by means of a winch 35.

What I claim as my invention is:

1. A vibratory head for drawing a flexible member, such as a tubular liner, through a pipe or bore, comprising:
    (a) a cylindrical housing having front and rear ends;
    (b) vibratory means mounted within the housing for vibrating the housing transversely to its axis;
    (c) means for connecting the flexible member to the housing;
    (d) a closure member closing the front end of the housing; and
    (e) means for connecting a tow cable to said closure member.

2. A vibratory head in accordance with claim 1, wherein the vibratory means comprises a rotary motor having an eccentric mass rotor driven by said motor.

3. A vibratory head for drawing a flexible tubular member through a pipe or bore, comprising:
 (a) a cylindrical housing having an outer surface and front and rear ends, the cylindrical housing being adapted to engage telescopically the tubular member so that said outer surface is embraced thereby;
 (b) vibratory means mounted within the housing for vibrating the housing transversely to its axis;
 (c) means for securing the flexible member to the outer surface of the housing;
 (d) a closure member closing the front end of the housing, and
 (e) means for connecting a tow cable to said closure member.

4. A vibratory head according to claim 3, wherein said means for connecting a tow cable to the closure member comprises a swivel mounting projecting forwardly from the closure member, and a pulley carried by the swivel mounting, the swivel mounting being coaxial with the cylindrical housing to permit the pulley to swivel freely with respect to the axis of the housing.

5. A vibratory head according to claim 3, wherein the motor is an air motor having air supply means connected to the rear end of the cylindrical housing.

6. A vibratory head according to claim 3, wherein the vibratory means comprises a rotary motor having an eccentric mass rotor driven thereby.

References Cited
UNITED STATES PATENTS

| | | | |
|---|---|---|---|
| 952,545 | 3/1910 | Persons | 29—234 |
| 2,794,758 | 6/1957 | Harper | 29—234 X |
| 3,358,769 | 12/1967 | Berry | 29—234 X |

ROBERT C. RIORDON, Primary Examiner

J. C. PETERS, Assistant Examiner

U.S. Cl. X.R.

138—97; 254—134.3